United States Patent [19]
Freetly et al.

[11] Patent Number: 6,066,304
[45] Date of Patent: May 23, 2000

[54] PROCESS FOR REMOVING SULFUR DIOXIDE OUT OF A GAS

[75] Inventors: Mark Freetly, Good Hope; John M. Heeney, Barrington, both of Ill.

[73] Assignee: Delores Pircon, Oak Brook, Ill.

[21] Appl. No.: 09/130,340

[22] Filed: Aug. 6, 1998

[51] Int. Cl.[7] .............................. B01D 53/50; C02C 1/24
[52] U.S. Cl. .................................... 423/243.06; 423/547
[58] Field of Search ................................ 423/243.06, 547

[56] References Cited

U.S. PATENT DOCUMENTS

| | | | |
|---|---|---|---|
| 2,142,987 | 1/1939 | Bacon et al. | 23/178 |
| 3,633,339 | 1/1972 | Wiewiorowski et al. | 55/37 |
| 3,843,789 | 10/1974 | Spector et al. | 423/242 |
| 3,927,178 | 12/1975 | Jordan et al. | 423/242 |
| 3,969,492 | 7/1976 | Witte et al. | 423/574 L |
| 4,004,966 | 1/1977 | Matty et al. | 162/30 R |
| 4,151,263 | 4/1979 | Ciuryla et al. | 423/242 |
| 4,269,489 | 5/1981 | Haese | 423/242 |
| 5,624,649 | 4/1997 | Gal | 423/243.11 |
| 5,630,991 | 5/1997 | Gal et al. | 423/243.01 |

FOREIGN PATENT DOCUMENTS

| | | | |
|---|---|---|---|
| 52-53774 | 4/1977 | Japan | 423/243.06 |

OTHER PUBLICATIONS

Aga Gas, Inc., Material Safety Data Sheet No. 4, Ammonia, (4 pages), Rev. Apr. 1992.

Arcadian Corporation, Material Safety Date Sheet No. 5, Poly–N (R), Ammonium Polyphosphate Solution, (8 pages), Rev. Apr. 15, 1996.

BAI et al., Particle Formation By $NH_3$–$SO_2$ Reactions At Trace Water Conditions, *Ind. Eng. Chem. Res.*, 88–94 (1992) vol. 31, No. 1.

Consoer Townsend & Associates, Task 2, Identification, Evaluation And Costing Of Preferred Conventional Flue Gas Desulfurization Processes For New Electric Utility Units, (92 pages) Oct. 1992.

Gautney et al., The Systems $NH_3$–$SO_2$–$P_3O_5$–$H_2O$ And $NH_3$–$SO_2$–$SO_3$–$P_2O_5$–$H_2O$ At 25° C., *J. Chem. Eng. Data*, 154–158 (1980) vol. 25, No. 2.

N.D. Moore, Fume Formation In Ammonia Scrubbers, *An ASME Publication*, (11 pages) (1977) for presentation at the Winter Meeting of the A.S.M.E. in Atlanta GA. USA, Nov. 27 to Dec. 2, 1977.

*Primary Examiner*—Steven P. Griffin
*Assistant Examiner*—Timothy C Vanoy
*Attorney, Agent, or Firm*—Howell & Haferkamp, L.C.

[57] ABSTRACT

A process is provided for scrubbing sulfur dioxide out of a flue gas by contacting the flue gas with a scrubbing liquid containing diammonium phosphate and ammonium sulfite and in which the total concentration of phosphates is maintained in a balance with the total concentration of sulfites so that the formation and release of plumes of ammonium sulfite are minimized. The sulfur dioxide in the flue gas reacts with the diammonium phosphate to produce monoammonium phosphate and ammonium bisulfite. A portion of the scrubbing liquid is contacted with ammonium ions to convert the monoammonium phosphate into diammonium phosphate and the ammonium bisulfite into ammonium sulfite, and the same portion of scrubbing liquid is contacted with oxygen to convert the ammonium ammonium sulfite into ammonium sulfate. Ammonium sulfate is removed from the process and the oxidized scrubbing liquid is recycled for further contact with flue gas.

17 Claims, 1 Drawing Sheet

PROCESS FOR REMOVING SULFUR DIOXIDE OUT OF A GAS

BACKGROUND OF THE INVENTION

(1) Field of the Invention

The present invention relates to the removal of sulfur oxides from exhaust gases, and more particularly to the removal of sulfur oxides from exhaust gases while avoiding fume formation and recovering a valuable product derived from the sulfur oxides.

(2) Description of the Related Art

Sulfur oxides (generically identified as $So_x$) are a common component of exhaust gases generated by boilers in steam and electric power production as well as by evaporators and dryers in paper pulp manufacturing plants and other industrial operations. Commonly, the sulfur oxide is sulfur dioxide, although other sulfur oxides such as sulfur monoxide (SO) or sulfur trioxide ($SO_3$) may be present. Such sulfur oxides are known to be harmful to the environment due to their propensity to form acid rain and to be corrosive when condensed from contaminated air onto any corrodible surface.

A number of processes have been developed to minimize the evolution of sulfur oxides in exhaust gases. These can be divided roughly into those processes that remove sulfur from the fuel prior to combustion and those processes that remove sulfur oxides from exhaust gases after combustion. The latter type of processes are termed flue gas desulfurization (FGD) processes. Of the FGD processes that have reached commercial importance, those that use finely milled limestone slurries to absorb and to react with the SOX and those that use magnesium oxide in similar systems account for about 90% of current commercial FGD systems for power generation plants (the most important of the fixed source generators of $SO_x$). Such processes commonly pump water slurries of finely milled limestone, or magnesium oxide, into a spray tower where droplets of the slurry contact the $SO_x$-containing exhaust gas as it flows up the tower. See, e.g., U.S. Pat. No. 5,630,991. The $SO_x$ is absorbed into the water and reacted with the mineral oxides to form calcium sulfate (gypsum) or magnesium sulfate, respectively. While limestone is a relatively inexpensive raw material, these processes have disadvantages such as the disposal of the large volumes of gypsum that are produced, the high cost of milling the limestone into particles that are small enough for reasonably fast reaction, the design of process flow equipment to handle abrasive slurries of solids rather than clear solutions and the reqirement for large amounts of limestone per unit of $SO_x$ removed due to the low reactivity of the limestone.

Dry sorbent injection systems comprise most of the rest of the commercial FGD systems now used on power plants, but those systems also have disadvantages of the use of specialized solid/liquid contacting equipment and the costs associated with moving large volumes of dry reactants and products.

Because of the dominance of the limestone scrubber process in present commercial use, many plants have existing limestone scrubbing equipment. It would be most economical, therefore, that any process that is used to replace a limestone scrubbing system be able to utilize much, if not all, of the same equipment. Thus, an alternative process for which a flue gas desulfurization system, such as a limestone scrubbing system, could easily be retrofitted would have an advantage over other alternative processes.

While liquid-based, non-slurry FGD systems have shown promise, such systems have yet to capture an appreciable part of commercial FGD applications. One of the most studied and best known of the liquid-based FGD processes is the absorption of $SO_x$ into water solutions of ammonium and ammonium salts. Such ammoniacal liquid scrubbing of exhaust gases was reported in U.S. Pat. No. 2,142,987, issued in 1939, where it was disclosed that aqueous solutions of weak acids capable of reacting with the sulfurous acid produced during the absorption of $SO_x$ in water could be used to recover $SO_x$. After the sulfur oxide was reacted with the weak acid to produce a sulfite, the solution containing the weak acid sulfite was heated to free the sulfur oxide and regenerate the weak acid. Ammonium salts of such weak acids were said to be among those that were preferred.

Later, Wiewiorowski and Vincent, U.S. Pat. No. 3,633,339, found that aqueous ammonium phosphate solutions could be used to strip sulfur dioxide from gas streams and further disclosed the removal of the sulfur dioxide from the ammonium phosphate stream by extraction into a liquid amine. The sulfur dioxide could then be released as a pure gas by heating the amine solution. Pure gaseous sulfur dioxide was the product of the process and both the ammonium phosphate solution and the amine solution were regenerated and recycled in the process. While this process produced gaseous sulfur dioxide as a product, it required a liquid/liquid extraction operation, which have been known to be difficult to control in systems where particulate contaminants can accumulate, and also required an energy-consuming stripping step.

Purified sulfur dioxide was also recovered by Jordan et al., U.S. Pat. No. 3,927,178, who reported absorption of sulfur dioxide into a concentrated solution of ammonium sulfate into which ammonia was added in the last stage of absorption. The purpose of the process was to minimize energy cost associated with the separation of solid ammonium sulfate. The scrubber solution was mixed with molten ammonium bisulfate to release pure gaseous sulfur dioxide, which was recovered, and to form ammonium sulfate. Ammonium sulfate crystals were heated to about 700° F. to free ammonia and to form molten ammonium bisulfate, both of which were recycled into the process at the points where those respective materials were used as stated above. As in the Wiewiorowski et al. process, the Jordan et al. process required heating to release gaseous sulfur dioxide, but, in addition, required a high temperature generator to melt ammonium sulfate. This increases not only the complexity of controlling the process, but also the danger associated with handling such hot material.

Witte et al., U.S. Pat. No. 3,969,492, disclosed a process that resulted in the recovery of elemental sulfur from sulfur dioxide in waste gas streams. The sulfur dioxide was absorbed into a solution of mono- and diammonium phosphate to form ammonium bisulfite. The ammonium bisulfite was then reacted with hydrogen sulfide, or other suitable reducing agents, to give a direct reduction of the sulfites to elemental sulfur and to regenerate the monoammonium phosphate to diammonium phosphate. It was also reported that absorbed sulfur dioxide could be thermally stripped from the mixed phosphate solution prior to reaction with $H_2S$ by thermal stripping, but it was said to be desirable that such desorption be carried out in the presence of a minimal amount of oxygen to prevent the oxidation of sulfites to sulfate. This process again showed that while gaseous sulfur dioxide could be produced, energy-demanding thermal stripping was necessary and toxic hydrogen sulfide gas was required.

Haese, in U.S. Pat. No. 4,268,489, reported the absorption of sulfur dioxide by an aqueous solution of ammonium sulfite and bisulfite. A portion of the solution discharged from the scrubber is oxidized to form ammonium sulfate and that oxidized ammonium sulfate solution is then used to further treat the scrubbed gas. It was reported that the benefit of such a process was that since the ammonium sulfate had practically no vapor pressure, the second scrubbing resulted in scavenging ammonia from the gas phase and returning it to the absorption system. Ammonium sulfate could also be produced as a product.

Recently, Gal, U.S. Pat. No. 5,624,649, disclosed a process wherein ammonia/ammonium sulfate in aqueous solution was used to strip sulfur dioxide from flue gas in the presence of oxidation air. The ammonium sulfate that was produced was further contacted with ammonia and the resulting ammonia/ammonium sulfate solution was contacted with potassium chloride to form crystalline potassium sulfate, which was withdrawn from the process as a product. Ammonia was regenerated from the ammonium chloride solution exiting the crystallizer by contact with lime. Calcium chloride was removed as a byproduct. While it was reported that the potassium sulfate was a useful fertilizer product, no uses were reported for the calcium chloride that was produced.

Early in the development of ammoniacal liquid-based FGD processes it was recognized that one particular problem that was unique to these processes was the formation of a persistent plume from the stacks of plants using ammoniacal FGD scrubber systems. While visible plumes are often observed from exhaust stacks of wet scrubbing systems, such plumes usually dissipate after a short period unless the waste gas also contains fine ammonium sulfate/sulfite salt particles that are termed "fume". Such fumes are discussed by Bai et al., *Ind. Eng. Chem. Res.,* 31:88–94, 1992; Gautney et al., *J. Chem. Eng. Data,* 25:154–158, 1980; and Moore, *Fume formation in ammonia scrubbers,* Manuscript No. 77-WA/APC-2, presented at Winter Annual Meeting of The American Society of Mechanical Engineers, Atlanta, Ga., Nov. 27–Dec. 2, 1977). Thus, while the ammoniacal FGD processes promised effective sulfur dioxide removal and reasonable costs, they suffered from the problem of forming unsightly and unacceptable visible and persistent plumes from the exhaust stacks.

One potential solution to this problem was proposed by Spector et al. in U.S. Pat. No. 3,843,789. This reference recognized that the plume or fume was generated within the absorber and was apparently caused by formation of very small particulates of ammonium sulfites in the gas phase. The solution that was proposed was to control the operating conditions in the scrubber, namely temperature and vapor pressure of sulfur oxides, ammonia and water, so that the concentrations of those three components in the gas phase were held below the level where fume formation was initiated. However, the methods disclosed for how such control was to be implemented focused on temperature control, control of the inlet concentrations of ammonia and sulfur dioxide and removal of solids from selected stages in a multi-stage absorber.

Later, others from the same group improved the control technique by disclosing that the water vapor pressure could be controlled by adding a non-volatile salt (such as ammonium sulfate) to selected parts of the absorber where depression of the water vapor pressure was desirable. See, for example, U.S. Pat. No. 4,151,263.

In other work, Matty et al., U.S. Pat. No. 4,004,966, reported a method for fume control for sulfur dioxide ammonia absorption systems that involved the control of pH in the scrubber to avoid the formation of ammonium hydroxide in the aqueous phase. It was reported that if pH was held to below about 5.9 in the scrubber and ammonium bisulfite were present, that ammonium hydroxide levels in the scrubbing liquid were low enought to avoid the formation of sulfite fume in the gas phase. The pH control was accomplished by distributing the addition of ammonia to a number of different points in the absorption system. While such control seemed to be effective, it required the use of pH sensors and controllers and a complex ammonia distribution and mixing system.

Thus, while ammoniacal liquid-based FGD systems promise advantages in effective removal of sulfur oxides at reasonable cost, problems still remain in how to properly control such systems to insure effective sulfur oxide removal from the flue gas while operating the system without fume formation; how to operate such a process to provide high sulfur dioxide removal efficiency; how to operate a process that provides clear solution scrubbing rather than slurry scrubbing; how to recover the removed sulfur oxides in the form of materials which have significant commercial value; and how to provide such processes without requirements for complex control systems or speciallized equipment so that they can be easily retrofitted into existing limestone scrubbing process equipment.

SUMMARY OF THE INVENTION

Briefly, therefore, the present invention is directed to a method for reducing the concentration of a sulfur oxide in flue gas, comprising contacting the flue gas with a soluble ammonium phosphate to convert the sulfur oxide to ammonium sulfate. Also provided is a method to control the formation of ammonium sulfite particulate plumes of the type typically associated with ammonia scrubbing of flue gas, such method comprising contacting the flue gas with a scrubbing liquid comprised of a water solution of diammonium phosphate, monoammonium phosphate, ammonium sulfate, ammonium sulfite and ammonium bisulfite while controlling the total concentration of the ammonium phosphates and ammonium sulfate relative to the total concentration of the ammonium sulfites so that significant plume formation is avoided.

Among the several advantages found to be achieved by the present invention, therefore, may be noted the provision of a system to reduce the concentration of sulfur oxide in a flue gas which can be easily controlled to insure effective sulfur oxide removal from the flue gas while operating without fume formation; the provision of such a process that has high sulfur dioxide removal efficiency; the provision of such a process that provides clear solution scrubbing rather than slurry scrubbing; the provision of such a process from which the sulfur oxides can be removed cost effectively in the form of materials which have significant commercial value; and the provision of such a process that does not have a requirement for complex control systems or speciallized equipment so that it can be easily retrofitted into existing flue gas desulfurization process equipment.

DETAILED DESCRIPTION OF THE PREFERRED EMBODIMENTS

Figure 1:
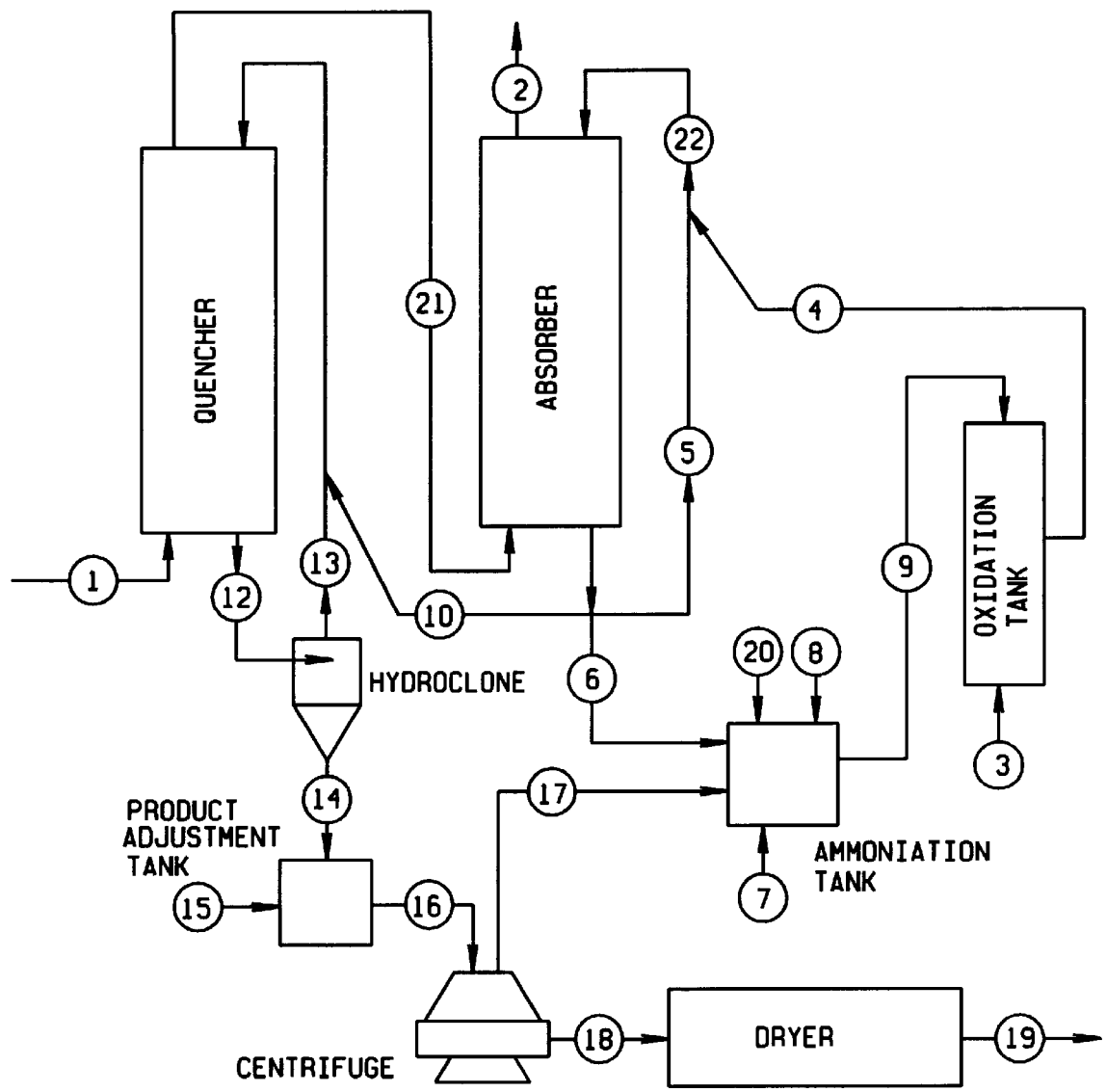
FIG. 1 is a conceptual process flow diagram for one embodiment of the process of the present invention.

In accordance with the present invention, it has been discovered that the concentration of a sulfur oxide in flue gas can be reduced by contacting the flue gas with a soluble ammonium phosphate to convert the sulfur oxide to ammonium sulfate. In fact, reductions in flue gas sulfur oxide concentration of 90% and more have been demonstrated. Furthermore, the method of the present invention can be carried out without the formation of ammonium sulfite particulate plumes of the type typically associated with ammonia scrubbing of flue gas.

Moreover, the present process requires no specially designed equipment and requires only a simple control system. In addition the reactivity to sulfur oxides per unit volume of the scrubbing liquid is higher than that of a limestone slurry process. Therefore, it is easily adapted for use in existing limestone slurry FGD installations.

The soluble ammonium phosphate serves as the major scavenger of sulfur oxides in the present invention. It can be supplied by any material that contains soluble ammonium phosphate. The soluble ammonium phosphate useful in the process may be in the form of diammonium phosphate (($NH_4)_2HPO_4$, ammonium orthophosphate-monohydrogen), monoammonium phosphate ($NH_4H_2PO_4$, ammonium orthophosphate-di-hydrogen), or hemibasic ammonium phosphate ($NH_4H_2PO_4.H_3PO_4$), and must be soluble in a liquid. It is preferred that the soluble ammonium phosphate be soluble in water. When it is said that the ammonium phosphate is soluble in the liquid, it is meant that the ammonium phosphate dissolves in such liquid at 20° C. in an amount of at least about 10% wt/wt. It is preferable that the soluble ammonium phosphate dissolve in such liquid in an amount of at least about 20% wt/wt, more preferably in an amount of at least about 30% wt/wt and most preferably in an amount of at least about 40% wt/wt, or greater. As used herein, the term "% wt/wt" is to be understood to mean "grams of the solute per 100 grams of the solution". Preferred sources of soluble ammonium phosphate are diammonium phosphate of laboratory, commercial or agricultural grade; ammoniated phosphate fertilizer (10-34-0 guarantee); and phosphoric acid of laboratory, commercial or agricultural grade. Agricultural grade diammonium phosphate is the most preferred source of soluble ammonium phosphate.

It has been shown that reasonably small amounts of soluble and insoluble contaminants as are typically contained in commercial or agricultural grade materials do not compromise the efficiency of the process of the present invention and commercial and agricultural grades of ammonium phosphates are acceptable for use in the present process. In fact, when fertilizer grade ammoniated phosphate is used as the source of soluble ammonium phosphate, the fertilizer value of the solid ammonium sulfate that is a product of the process may actually be improved due to the inclusion of other beneficial compounds supplied by the ammoniated phosphate.

The soluble ammonium phosphate is preferably used in the process as one component of a scrubbing liquid. The scrubbing liquid is composed, at least, of the soluble ammonium phosphate and a liquid in which the ammonium phosphate is soluble, as solubility is defined above. While any of a variety of liquids or mixture of liquids can be used, water is a highly preferred liquid and more preferably the sole solvent. Thus, optimally, the scrubbing liquid is aqueous, in which case the ammonium phosphate is water soluble.

As the scrubbing liquid is circulated through the several steps, or stages, of the process of this invention, it undergoes changes in pH, temperature and chemical composition. However, despite such changes, the liquid that circulates through the several steps of the present process is referred to by the term of "scrubbing liquid". When it is desireable to identify properties of the scrubbing liquid at some point in the process, the scrubbing liquid is identified as the scrubbing liquid at a particular point in the process. Examples of such descriptions are, the "scrubbing liquid before ammoniation"; the "scrubbing liquid exiting the first contacting stage"; or the like. The identity of such scrubbing liquid at particular points in the process is further defined by reference to the numbered process flow streams indicated on FIG. 1 which correspond to particular points in the process.

After the process has been in operation in the method of this invention for more than a brief period of time, the scrubbing liquid may contain diammonium phosphate, monoammonium phosphate, sulfurous acid ($H_2SO_3$), ammonium bisulfite ($NH_4HSO_3$), ammonium sulfite (($NH_4)_2SO_3$) and ammonium sulfate (($NH_4)_2SO_4$). Such components may be dissolved in a solution, or may be partly dissolved and partly suspended solids. As used herein, the term "solution" is to be understood in its broadest sense to include fine dispersions and emulsions as well as true solutions. As previously mentioned, the relative concentration of these components can change significantly as the scrubbing liquid is circulated through the several parts of the process. The diammonium phosphate and the ammonium sulfite, however, are the major reactants for sulfur oxide that are present in the scrubbing liquid. When the soluble ammonium phosphate has reacted with sulfur oxides to form an ammonium sulfite, the form of the ammonium phosphate after such reaction is termed "soluble reduced ammonium phosphate", or "reduced ammonium phosphate". For example, when diammonium phosphate is the soluble ammonium phosphate, monoammonium phosphate is the reduced soluble ammonium phosphate. It is also to be understood that the reduced ammonium phosphate can also be soluble in the same liquid as the soluble ammonium phosphate, and even in the same or greater amount.

The present process is useful for reducing the concentration of sulfur oxides in flue gas. As used herein, the term "flue gas" is meant to include any gaseous stream having some concentration of a sulfur oxide. It is intended that sulfur monoxide (SO), sulfur dioxide ($SO_2$), sulfur trioxide ($SO_3$), and sulfur tetraoxide ($SO_4$), are to be considered "sulfur oxides" and may be represented by the designation "$SO_x$". Sulfur dioxide is the most common sulfur oxide to be treated. In a preferred embodiment of this invention, the degree of removal of sulfur oxides is such that the flue gas that is vented to the atmosphere contains no more than 20% of the amount of sulfur oxides that were initially present in the flue gas. It is more preferable that the vented flue gas contain no more than 10% of the initial sulfur oxides and most preferable that it contain less than 5% of the initial sulfur oxides.

Such flue gases containing sulfur oxides are commonly generated as exhaust gases from power generating facilities, particularly those that burn high sulfur coal, or sulfur-containing heavy oils. However, such gases are also generated during hydrocarbon and chemical processing operations, paper pulping manufacture and even during some food and animal processing activities. It is not unusual for such exhaust gases, particularly those from power generation boilers, to be very hot—of temperatures often up to about 150° C., or higher. While these gases must be cooled before entering some of the alternative FGD processes, it is an advantage of the present process that the higher temperature of the exhaust gases actually is beneficial to the process, as is explained below.

The present process may be operated in either a batch or a continuous-flow mode. It is advantageous, however, to operate the process as a continuous-flow system to use the process equipment most efficiently. One possible arrangement of equipment to carry out the steps of one embodiment of the present process is shown in FIG. 1. The process shown is for a continuous-flow process which employs a two-stage contacting system operated in countercurrent-flow mode. The numbers referred to below correspond to those shown on FIG. 1.

In the method of the present invention, the flue gas is contacted with the scrubbing liquid to absorb sulfur oxide into the liquid. The major part of the sulfur oxide absorption into the liquid phase, as well as the major part of a conversion of the dissolved sulfur oxide to sulfurous acid and reaction of the sulfurous acid with the soluble ammonium phosphate may take place in an absorber, which may also be referred to herein as a spray tower or a second contacting stage. Flue gas (21) enters the absorber and is contacted with the scrubbing liquid (22). While any gas/liquid contacting device may be used, it is common for the contacting to be effected either by bubbling the gas through the liquid, as in a tray-type or packed column, or by spraying liquid droplets down through the gas, as in a spray tower. In either case, sulfur oxides are absorbed from the gas phase into the scrubbing liquid. For simplification, the following discussion will be directed to an aqueous scrubbing solution and sulfur dioxide as the sulfur oxide. It should be understood, however, that this is merely illustrative, and other liquids may be used and other sulfur oxides may be treated.

In the case where sulfur dioxide is absorbed into water, the sulfur dioxide reacts with water to form the weak acid, sulfurous acid according to the reaction:

$$SO_2 + H_2O \rightarrow H_2SO_3 \qquad (1)$$

The weak acid then reacts with the soluble ammonium phosphate to yield ammonium bisulfite and reduced soluble ammonium phosphate. Where diammonium phosphate is the soluble ammonium phosphate, the diammonium phosphate reacts with sulfurous acid to form monoammonium phosphate and ammonium bisulfite; to wit:

$$(NH_4)_2HPO_4 + H_2SO_3 \rightarrow NH_4H_2PO_4 + NH_4HSO_3 \qquad (2)$$

When ammonium sulfite is also a component of the scrubbing liquid, it can also react to bind sulfurous acid as ammonium bisulfite:

$$(NH_4)_2SO_3 + H_2SO_3 \rightarrow 2NH_4HSO_3 \qquad (3)$$

Furthermore, if any oxygen is present in the flue gas as it enters the absorber, it can react with the ammonium bisulfite and an ammonium ion to form ammonium sulfate:

$$NH_4HSO_3 + \tfrac{1}{2}O_2 + NH_4^+OH^- \rightarrow (NH_4)_2SO_4 + H_2O \qquad (4)$$

This reaction could occur in the scrubbing vessel, but normally would occur in the ammoniation tank and oxidation tower.

The pH of the scrubbing liquid in the absorber is normally between about 4.8 and 6.0, more preferably between about 5.4 and 6.0, and the pH of the scrubbing liquid as it exits the absorber (10) is preferably between about 5.3 and 5.5. In most utility applications, the scrubbing liquid in the absorber (s) would reach temperature equilibrium between about 110° F. and 140° F.

Soluble ammonium phosphate and ammonium sulfite are the main components of the scrubbing liquid in the absorber that act as reactants for sulfurous acid. Thus, in order to effectively remove the sulfur oxide from the flue gas, it is preferred that these components be maintained in the absorber in sufficient levels to react with substantially all of the sulfur oxide that enters the absorber with the flue gas. When diammonium phosphate is the soluble ammonium phosphate, it is preferred that the total concentration of diammonium phosphate and ammonium sulfite in the scrubbing liquid is sufficient to react with sulfurous acid formed when the sulfur oxide in the flue gas is contacted with the scrubbing liquid. The phrase "total concentration of diammonium phosphate and ammonium sulfite", is to be understood to mean the concentration of diammonium phosphate plus the concentration of the ammonium sulfite.

Ammonia vapor reacting with sulfur oxides in the flue gas forms ammonium sulfites, which are believed to be the cause of the characteristic plume of ammonium sulfite particulates that often forms with the use of conventional ammoniacal FGD scrubbing systems. (See, e.g., Bai et al., *Ind. Eng. Chem. Res.*, 31:88–94, 1992; Gautney et al., *J. Chem. Eng. Data*, 25:154–158, 1980; and Moore, *Fume formation in ammonia scrubbers*, Manuscript No. 77-WA/APC-2, presented at Winter Annual Meeting of The American Society of Mechanical Engineers, Atlanta, Ga., Nov. 27–Dec. 2, 1977). In conventional systems, ammonium sulfite and ammonium bisulfite are the predominant ammonium salts of sulfur in the scrubbing liquid. Both ammonium sulfite and ammonium bisulfite result in appreciable ammonium vapor pressure when dissolved in water. Therefore, as flue gas is introduced into the conventional ammoniacal liquid FGD systems, some of the sulfur oxide reacts with ammonium in the gas phase, resulting in the formation of ammonium sulfites, which exit the stack as a visible plume.

The inventors have discovered that the use of a soluble ammonium phosphate, such as diammonium phosphate, as the main reactant for sulfur oxide in combination with ammonium sulfite, results in a reduced ammonium vapor pressure over the scrubbing liquid in the contacting stage of the process compared with the ammonium vapor pressure that results from a solution of, for example, ammonium sulfite or ammonium hydroxide alone of comparable reactivity with sulfur oxide. Surprisingly, this reduced ammonium vapor pressure reduces or eliminates the gas-phase reaction between ammonium and sulfur oxide and thereby avoids significant plume formation.

It has been found that the tendency to form a plume is reduced when the total concentration of phosphates (the sum of the concentration of soluble ammonium phosphate and the concentration of reduced ammonium phosphate) is maintained in a balance with the total concentration of sulfites (the sum of the concentration of ammonium sulfite and the concentration of ammonium bisulfite) that results in an ammonium vapor pressure of the scrubbing liquid that is lower than that of a solution of ammonium sulfite alone having equal chemical activity. The phrase "ammonium sulfite alone" refers to a solution of ammonium sulfite in the same liquid as the soluble and reduced ammonium phosphate and ammonium sulfite and bisulfite, except without the other salt components of the scrubbing liquid. By "equal chemical activity", it is meant that the solution of ammonium sulfite and the solution of soluble and reduced ammonium phosphates and ammonium sulfate have the capability to react with sulfur oxide at the same rate under comparable conditions of temperature and pressure.

A further discovery has been that the levels of ammonium sulfite and ammonium bisulfite in the scrubbing liquid can be effectively controlled by oxidizing the sulfites to sulfate, which is much less volatile than the sulfites and can be allowed to accumulate in the scrubbing liquid without the risk of plume formation.

In the oxidation process (which may herein be referred to as the "oxidation") the ammonium bisulfite and the reduced ammonium phosphate are oxidized by reacting the ammonium bisulfite and the reduced ammonium phosphate with ammonium ions to convert the ammonium bisulfite to ammonium sulfite and the reduced ammonium phosphate to regenerated soluble ammonium phosphate, and the ammonium sulfite is exposed to an oxidant to convert the ammonium sulfite to ammonium sulfate.

While almost any oxidant may be used, oxygen in gaseous form is the preferred oxidant. Oxygen can be supplied in pure or concentrated form, or may be supplied by air. The most preferred source of oxygen is air.

The oxidation can be carried out either in the absorber itself, or in a side stream that is removed from the absorber and returned to the absorber after the oxidation treatment. Removal of a side stream is preferred, because conditions for oxidation can be optimized in the side stream without disrupting or comprimising the preferred reaction conditions in the absorber.

In one embodiment of the process, a stream of the scrubbing liquid (6) is removed from the absorber and fed into an oxidation system. A preferred embodiment of the oxidation step is shown in FIG. 1, where the oxidation is carried out in two separate stages—an ammoniation followed by contact with an oxidant. While any source of ammonium ions can be used, the preferred source of ammonium ions is anhydrous ammonia.

When diammonium phosphate is the soluble ammonium phosphate, the ammonium bisulfite and the monoammonium phosphate are activated by reaction with ammonium ions to form ammonium sulfite and regenerated diammonium phosphate. When the soluble ammonium phosphate is supplied as, for example, monoammonium phosphate, the activation of the phosphate as a reactant for sulfur oxides takes place during the oxidation, wherein the monoammonium phosphate is converted into diammonium phosphate. Thus,

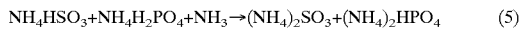

$$NH_4HSO_3 + NH_4H_2PO_4 + NH_3 \rightarrow (NH_4)_2SO_3 + (NH_4)_2HPO_4 \qquad (5)$$

In the ammoniation, the ammonium bisulfite and reduced ammonium phosphate are reacted with an amount of ammonium ions that is sufficient to increase the pH of the scrubbing liquid to between 6.0 and 7.0. It is preferred that the pH of the scrubbing liquid exiting the ammoniation (9) be about 7.0. An advantage of carrying out the ammoniation before the addition of an oxidant is that the increase in pH in the ammoniated scrubbing liquid increases the effectiveness of the oxidation.

At pH values between about 4 and 8, the scrubbing liquid in the ammoniation system (which carries out the step that may herein be referred to as "ammoniation") contains a mixture of diammonium and monoammonium phosphates and ammonium sulfites (including ammonium sulfite and ammonium bisulfite) and ammonium sulfate. As suggested by equation (5), above, lower pH values favor higher levels of monoammonium phosphate and ammonium bisulfite, while higher pH values favor higher levels of diammonium phosphate and ammonium sulfite. At a pH of approximately 5.6 the phosphates are approximately 50% diammonium and 50% monoammonium phosphate and the sulfites are also approximately evenly divided between the sulfite and bisulfite forms. Therefore, at the preferred pH of about 7 after ammoniation, the reaction of equation (5) is forced toward ammonium sulfite and diammonium phosphate.

After the ammoniation, the stream containing the ammonium sulfite and regenerated diammonium phophate (9) is exposed to an oxidant (3) to convert the ammonium sulfite to ammonium sulfate. Oxygen is a preferred oxidant and when air is the source of oxygen, the reaction is:

$$(NH_4)_2SO_3 + \tfrac{1}{2}O_2 \rightarrow (NH_4)_2SO_4 \qquad (6)$$

It has been found that the oxidation process of the present invention is a key step in the control of plume formation. To control plume formation, the scrubbing liquid is exposed to an oxidant in an amount sufficient to maintain the total concentration of the soluble and reduced ammonium phosphates and ammonium sulfate in the scrubbing liquid relative to the total concentration of the ammonium bisulfite and ammonium sulfite such that significant plume formation is avoided. The phrase "total contration of the soluble and reduced ammonium phosphates and ammonium sulfate" is to be understood to mean the sum of the concentration of the soluble ammonium phosphate (e.g., diammonium phosphate), the concentration of reduced ammonium phosphate (e.g., monoammonium phosphate) and the concentration of ammonium sulfate. By "significant plume formation" it is meant that the visible opacity of the ammonium sulfite/ sulfate plume is about 10%. It is preferable that the opacity of the plume be less than about 6%, more preferable that the opacity be less than about 4%, and most preferable that the opacity be less than about 2%. In this instance, the term "plume opacity" refers to the opacity of the ammonium sulfite/sulfate fume after any condensed water vapor included with the exhaust stream has evaporated into invisible water vapor.

The balance between the total concentration of phosphates and the total concentration of sulfites that will avoid significant fume formation can vary according to a number of system variables. However, by adjusting the level of oxidation that is used in the process, an operator of ordinary skill can easily find operating conditions that avoid significant fume formation for almost any set of system variables. In general, the use of a level of oxidation that maintained the total concentration of sulfites below about 1% has been found to result in fume free operation.

The scrubbing liquid exiting the oxidation (4) is recycled to the absorber. Such liquid contains the regenerated soluble ammonium phosphate and ammonium sulfate. Before entering the absorber the scrubbing liquid from the oxidation (4) can be mixed with scrubbing liquid being recycled into the absorber (5) to form the stream of scrubbing liquid entering the absorber (22). Therefore, at least some of the soluble ammonium phosphate in the scrubbing liquid entering the absorber (22) is made up of at least some of the regenerated soluble ammonium phosphate. While ammonium sulfite and bisulfite may also be present in the recycled scrubbing liquid (4), they are present in concentrations that are significantly lower than the concentrations present in the scrubbing liquid exiting the absorber (6). The scrubbing liquid that is recycled to the absorber (4) preferably has a pH of from about 6.0 to about 7.0. More preferably, the scrubbing liquid that is recycled to the absorber (4) has a pH of from about 6.8 to about 7.0.

In a preferred embodiment of the process, the scrubbing solution, regenerated by ammoniation and oxidation, is then recycled back to the absorber with each cycle through the oxidation producing additional ammonium sulfite which, in turn, is ammoniated and oxidized to form ammonium sulfate. The ammonium sulfate accumulates in the recirculating scrubbing liquid.

In one embodiment of the present process, make-up water (20) and make-up soluble ammonium phosphate (8) are added at the ammoniation step. The term "make-up", as used herein, is to be understood to mean that amount of material that is added to the process to replace such material lost from the process, both with the products and by-products, and by leakage or evaporation. When diammonium phosphate is the soluble ammonium phosphate, it is preferred that it be added to the ammoniation step in water solution. In another embodiment of the ammoniation and oxidation process, anhydrous ammonia gas may be premixed with air and the combined gases sparged into a single vessel where both ammoniation and oxidation occur.

The ammoniation and the oxidation can be carried out in any suitable tank, vessel or device that permits effective gas/liquid mixing and is manufactured of material that resists corrosion by the liquids and gases with which it comes in contact. Agitated tanks with gas spargers under the liquid level, tray-type or packed bed towers, or any other type of gas/liquid contactor may be used.

The concentration of ammonium sulfate can be allowed to build up in the scrubbing liquid since the ammonium sulfate has substantially no vapor pressure. This permits the ammonium sulfate to be crystallized and separated from the scrubbing liquid without substantial energy input. Moreover, by separating the absorption into two stages, hot flue gases can be directly contacted with the scrubbing liquid to evaporate part of the liquid which results in further concentration of the ammonium sulfate. This results in energy savings, because no other outside energy input is required to effect the evaporation.

When the concentration of ammonium sulfate in the scrubbing liquid in the absorber has increased to a desired level, a portion of the scrubbing liquid exiting the absorber is removed from the absorber (10) and fed to the quenching step. Herein, the quenching may also be referred to as the "first contacting stage". It is preferred that the concentration of ammonium sulfate in the scrubbing liquid exiting the second contacting stage (10) is between about 25% and 35% wt/wt, and more preferably is about 30% wt/wt.

In an embodiment of the present process that could be carried out in the equipment arrangement shown in FIG. 1, the flue gas that initially enters the process (1) is contacted with the scrubbing liquid in countercurrent fashion in at least two stages. Flue gas entering a first contacting stage (1) is contacted with scrubbing liquid from a second contacting stage (10), while the scrubbing liquid that exits the first contacting stage (12) has completed the contacting and the flue gas exiting the first contacting stage (21) is fed to a second contacting stage. The flue gas fed from the first to the second contacting stage (21) is contacted with scrubbing liquid as it first enters the contacting (22), where such scrubbing liquid comprises at least some of the regenerated soluble ammonium phosphate, while the flue gas that exits the second contacting stage (2) is vented to the atmosphere after entrained liquid droplets are removed and scrubbing liquid from the second contacting stage (10), or a side stream therefrom, is fed to the first contacting stage.

An advantage of that embodiment of the present process, which can be carried out in the equipment arrangement shown in FIG. 1, is that the flue gas fed to the process (1) may be hot and does not need to be cooled prior to entering the process. During the quenching step, the hot flue gas heats the scrubbing liquid in the first contacting stage, preferably to the saturation temperature of the gas, and evaporates at least some part of the liquid, which hot vapor then passes with the flue gas (21) to the second contacting stage, in turn heating the liquid in the second stage. By "saturation temperature" of the gas, it is meant the saturation temperature of the gas at the pressure of the gas in the contacting stage. The nonvolatile solids in the scrubbing liquid in the first contacting stage are thereby concentrated, preferably to the extent that the scrubbing liquid becomes saturated with ammonium sulfate. When the scrubbing liquid becomes saturated with ammonium sulfate, crystallization of ammonium sulfate is initiated, or occurs spontaneously, and growth of ammonium sulfate crystals proceeds. Thus, the scrubbing liquid exiting the first contacting stage (12) is preferably saturated with ammonium sulfate and contains ammonium sulfate in solid form. The scrubbing liquid exiting the first contacting stage (12) has a pH of from about 2.0 to about 4.0, preferably has a pH of from about 2.8 to about 4.0 and more preferably has a pH of from about 2.8 to about 3.2, and has an ammonium sulfate concentration of above about 40%, and preferably above about 50% wt/wt, and more preferably, the scrubbing liquid is saturated with ammonium sulfate at the temperature and composition of the scrubbing liquid at that point.

The solid ammonium sulfate can be separated from the scrubbing liquid exiting the first contacting stage (12) and its value recovered as, for example, a fertilizer. Such a recovery process includes separating solid ammonium sulfate from the saturated scrubbing liquid exiting the contacting stage (12) and recycling the scrubbing liquid from which solid ammonium sulfate has been separated (17) by feeding the clarified liquid back to the oxidation vessel(s) where the clarified liquid is contacted with ammonium ions and an oxidant before being added to the scrubbing liquid being fed to the contacting step (22).

An equipment arrangement suitable for carrying out a preferred embodiment of a recovery process is shown schematically in FIG. 1, where the separation of solid ammonium sulfate from the saturated scrubbing liquid (12) is carried out by concentrating the ammonium sulfate solids into a stream of concentrated solids (14) and a stream of clarified liquid (13) and returning the clarified liquid (13) to the contacting stage. The saturated scrubbing liquid (12) can be removed sporadically from the quencher, or the removal can be done continuously. In either instance, the saturated scrubbing liquid (12) can be pumped through a hydroclone, or continuous flow centrifuge, such as a solid bowl-scroll type centrifuge, or a split-bowl type centrifuge, or any other solid/liquid separator. After passing through the separator, the clarified liquid (13) is returned to the quenching stage and the stream of concentrated ammonium sulfate solids (14) is further separated into a stream of solids (18) and a second stream of clarified liquid (17). This can be done, for example, by pumping the stream of concentrated ammonium sulfate solids (14) through a continuous flow, solids discharge centrifuge. The scrubbing liquid from which solid ammonium sulfate has been separated (17) can then be returned to the oxidation step and recycled by contacting the clarified scrubbing liquid (17) with ammonium ions and an oxidant before adding such recycled scrubbing liquid to the contacting step. It is preferred that the present process be operated so that the ammonium sulfate accumulates to a level where it crystallizes, but where substantially all of the phosphates remain in solution. Such operation permits selective separation and removal of the solid ammonium sulfate

(19) while recycling most of the phosphates back to the process in clarified scrubbing liquid streams (13) and (17). The only loss of phosphates, therefore, is with the liquid that accompanies the ammonium sulfate solids in the concentrated solids from the final solid/liquid separation (18).

In the embodiment of the process that can be carried out in that arrangement of process equipment shown in FIG. 1, a product adjustment tank can be interposed between the hydroclone and the centrifuge. The concentrated ammonium sulfate stream (14) can be allowed to cool in this tank, if desired, in order to promote further crystal growth of ammonium sulfate. In one preferred embodiment, ammonium ions are added to the concentrated ammonium sulfate in the product adjustment tank to bring the conversion of ammonium bisulfite to ammonium sulfite further toward completion to permit any oxygen in the scrubbing liquid to react with the sulfite to form sulfate.

It is often desirable that the concentrated ammonium sulfate solids (18) that are recovered from the process be stabilized so that they can be stored without degradation and shipped at a minimum of expense. A preferred method for such stabilization is to pass the concentrated solids (18) through a dryer to produce dried ammonium sulfate (19) that is suitable for storage, transportation and sale. While almost any type of solids dryer may be used, some examples of preferred dryers are rotary kilns, Holofilte® type rotating screw dryers, flash dryers, moving belt dryers and ebulating bed dryers.

While the absorber and other pieces of equipment that contact the scrubbing liquid can be made of almost any material, it is preferred that they be constructed of a material which resists corrosion by the chemicals with which they come in contact. Thus, since the chemicals that are used in the present invention are relatively aggressive against some metals when they are present in water solution at elevated temperature, it is preferred that some type of stainless steel or coated steel be used.

The ammonium sulfate that is produced by the present process has significant value as a fertilizer. It can be used in liquid or solid form and contributes nitrogen and some phosphorous. When dry, the ammonium sulfate product is stable in storage and safe to handle and transport. The product can be used where any other conventional ammonium sulfate fertilizer would be beneficial.

The following examples describe preferred embodiments of the inventions. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

Demonstration of the soluble phosphate FGD process in a 1 MW pilot plant using agricultural grade diammonium phosphate as the soluble ammonium phosphate and at varying pH levels in the scrubbing liquid.

A pilot plant having the components shown in FIG. 1 was constructed next to a commercial coal-fired steam generating station. The pilot plant was operated at flue gas volumes ranging from 3500 to 6300 SCFM with the majority of testing performed at 4500 SCFM. The flue gas was obtained as a slip stream from the commercial boiler exhaust gas flue system and was supplied through a 14 inch duct. Flow rate of flue gas into the pilot plant was measured by a Venturi flow meter and was controlled by a damper in the 14 inch duct. The flue gas flow rate and the pilot plant operating system was controlled by process operators from a central computer using GENESIS control software. Set points for controlled variables were entered into the control software. Level control in the process vessels was maintained by gravity flow and visual observation. Data was collected during the test by sensors connected to the control computer and by physically taking data in tabular form. Independent variables were sulfite concentration in the scrubbing liquid, pH of the scrubbing liquid and source of soluble ammonium phosphate. Dependent variables were sulfur oxide removal efficiency, plume formation and product analysis.

Granular agricultural grade diammonium phosphate was used as the soluble ammonium phosphate. The test lasted for seven days and was run with a flue gas feed rate of 4000 SCFM. The final total dissolved solids (TDS) concentration in the scrubbing liquid was 14% wt/wt. Total suspended solids (TSS) concentration in the scrubbing liquid exiting the absorber averaged between 2–3% wt/wt. The suspended solids consisted of insoluble iron, aluminum and magnesium ammonium phosphate compounds. The scrubbing liquid in the absorber was operated over a range of pH of 3.5 to 6.0. $SO_2$ removal was low at the lower pH level (approximately 30% removal) and increased to approximately 90% at the higher pH level. The final TDS in the quencher was about 23% wt/wt.

EXAMPLE 2

Demonstration of the soluble phosphate FGD process in a 1 MW pilot plant using agricultural grade diammonium phosphate as the soluble ammonium phosphate and with the scrubbing liquid at a pH of about 6.

The test was run for 11 days in the pilot plant and under the operating conditions described in Example 1, except that the pH of the scrubbing liquid in the absorber was maintained at about 6.0 and the TDS concentration of the scrubbing liquid was allowed to increase to higher levels. The TDS level in the scrubbing liquid was allowed to increase to 50% in the quencher and to about 40% in the scrubbing liquid exiting the absorber. Approximately 90% $SO_2$ removal was achieved throughout the test.

EXAMPLE 3

Demonstration of the soluble phosphate FGD process in a 10 MW pilot plant using agricultural grade diammonium phosphate as the soluble ammonium phosphate and with the scrubbing liquid at a pH of about 6.

A pilot plant of approximately 10 times the scale of that described in Example 1 was constructed and used to demonstrate the process of the invention. The same source of flue gas as described in Example 1 was used and the equipment design and layout was similar to that for the 1 MW pilot plant and similar to the process flow sheet shown in FIG. 1. Operation and data collection for the 10 MW pilot plant was similar to that described for the smaller plant.

The plant was operated for 28 days. Soluble ammonium phosphate was supplied by a water solution of agricultural grade diammonium phosphate (10-34-0; referring to percent by weight of nitrogen, $P_2O_5$ and $K_2O$, respectively). The use of liquid phosphates was found to greatly reduce the initial preparation procedures compared the granular form of ammonium phosphates which required solubilizing and settling to remove insoluble solids prior to use. The scrubbing liquid in the absorber was maintained at a pH of about 5.0–5.2 during the test, while the pH in the oxidation loop was maintained at about 6.0. It was found that pH control and control of oxidation were the key variables for optimum process operation. Oxidation was found to be important to operation of the process without the formation of a particulate plume in the stack gases. The pH had a controlling influence on the effectiveness of the oxidation process. When a low sulfite level is maintained in the scrubbing liquid in the absorber, plume free operation is achieved and sulfur dioxide removal is greater than 90%. The average sulfur dioxide removal during the test was greater than 90%. Particulate emissions were observed infrequently during the test when control variables drifted from the desired set point.

EXAMPLE 4

Analysis of the solid ammonium sulfate product as a fertilizer.

Analyses of percent nitrogen and percent phosphorous was carried out according to conventional fertilizer testing procedures on two grades of raw liquid product obtained from the scrubbing liquid described in Example 2. The liquid contained about 40%–45% total dissolved solids. The analysis of the samples is shown in Table 1. In addition, a TCLP analysis of heavy metals was carried out for the same sample according to the methods of IEPA. Those data are presented in Table 2.

TABLE 1

Product sample analysis for fertilizer value.

| Sample No. | Product ID | Guarantee Analysis | Nitrogen (%) | Phosphorus (% as $P_2O_5$) |
|---|---|---|---|---|
| 90070 | A | 8.7-4-0 | 9.1 | 3.99 |
| 90071 | B | 6.9-2.8-0 | 7.34 | 2.69 |

TABLE 2

Analysis of heavy metals.

| METAL | AMOUNT (mg/kg) |
|---|---|
| Arsenic | 10 |
| Cadmium | <0.14 |
| Chromium | 1.4 |
| Copper | 0.52 |
| Mercury | <0.006 |
| Potassium | 930 |
| Manganese | 3.2 |
| Molybdenum | 0.84 |
| Nickel | 2.5 |
| Lead | <0.29 |
| Selenium | <1.2 |

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawing shall be interpreted as illustrative and not in a limiting sense.

What is claimed is:

1. A method for reducing the concentration of sulfur dioxide in a flue gas, comprising contacting the flue gas with a scrubbing liquid comprising diammonium phosphate and ammonium sulfite at a pH so that the sulfur dioxide is sorbed into the scrubbing liquid and reacts with the diammonium phosphate to produce a scrubbing liquid comprising monoammonium phosphate and ammonium bisulfite and a gas having a diminished concentration of sulfur dioxide;

reacting a portion of the scrubbing liquid with ammonia to form a scrubbing liquid comprising ammonium sulfite and diammonium phosphate;

contacting said portion of the scrubbing liquid with oxygen to produce a scrubbing liquid comprising ammonium sulfate and diammonium phosphate; and then returning said portion of the scrubbing liquid for further scrubbing of flue gas, in order to maintain the total concentration of phosphates and the total concentration of sulfites in the scrubbing liquid contacting the flue gas in a balance so as to minimize the formation of plumes of ammonium sulfite.

2. The method of claim 1, wherein the pH of the scrubbing liquid contacting the flue gas is in the range of about 4.8 to 6.0.

3. The method of claim 2, wherein the total concentration of diammonium phosphate and ammonium sulfite in the scrubbing solution is sufficient to react with the sulfurous acid formed when sulfur dioxide in the flue gas is contacted with the scrubbing liquid.

4. The method of claim 3, wherein a sufficient amount of ammonia is reacted with the portion of the scrubbing liquid to increase the pH of the scrubbing liquid to between 6.0 and 7.0.

5. The method of claim 4, wherein the scrubbing liquid is contacted with the flue gas in an absorber and further comprising the step of passing another portion of the scrubbing liquid from the absorber into an upstream quencher which cools the flue gas and heats the scrubbing liquid.

6. The method of claim 5, wherein the scrubbing liquid exiting the quencher has a pH of from about 2.8 to about 4.0.

7. The method of claim 5, wherein the scrubbing liquid in the quencher is heated to a temperature that is sufficiently high that a portion of the liquid is evaporated thereby concentrating scrubbing liquid to the point where the concentration of ammonium sulfate in the scrubbing liquid is at least about 40% by weight.

8. The method of claim 7, further comprising the step of passing at least a portion of the heated scrubbing liquid from the quencher through a separator and recycling the clarified portion of the scrubbing liquid from the separator back to the quencher and recovering solid ammonium sulfate from the ammonium sulfate containing portion of the scrubbing liquid.

9. The method of claim 8, wherein solid ammonium sulfate is recovered by passing the ammonium sulfate containing portion of the scrubbing liquid into a product adjustment tank wherein ammonium sulfate crystallizes.

10. The method of claim 9, further comprising the step of adding ammonium ions to the ammonium sulfate containing portion of the scrubbing liquid in the product adjustment tank.

11. The method of claim 9, further comprising the step of transferring the ammonium sulfate containing portion of the scrubbing liquid from the product adjustment tank to a solid/liquid separator to separate ammonium sulfate solids out of the ammonium sulfate containing portion of the scrubbing liquid and removing the ammonium sulfate solids out of the process and recycling the supernatant liquid from the solid/liquid separator to the ammoniation step.

12. The method of claim 1, wherein the phosphate values of the diammonium phosphate is supplied by a material selected from the group consisting of phosphoric acid, ammoniated phosphate fertilizer, diammonium phosphate and mixtures thereof.

13. The method of claim 1, wherein the scrubbed flue gas contains no more than 10 percent of the sulfur dioxide that was in the unscrubbed, sulfur dioxide contaminated flue gas.

14. The method of claim 5, wherein the concentration of ammonium sulfate in the scrubbing liquid exiting the absorber is between about 25% and 35% by weight.

15. The method of claim 5, wherein the concentration of ammonium sulfate in the scrubbing liquid exiting the quencher is above about 40% wt/wt.

16. The method of claim 15, wherein the concentration of ammonium sulfate in the scrubbing liquid exiting the quencher is above about 50% wt/wt.

17. The method of claim 6, wherein the scrubbing liquid exiting the quencher is saturated in ammonium sulfate.

* * * * *